(12) United States Patent
Rallis et al.

(10) Patent No.: US 10,774,213 B2
(45) Date of Patent: *Sep. 15, 2020

(54) POLYMER COMPOSITION FOR THE MANUFACTURE OF THERMOFORMED ARTICLES

(71) Applicant: Novamont S.p.A., Novara (IT)

(72) Inventors: Angelos Rallis, Novara (IT); Matteo Nicolini, Borgomanero (IT)

(73) Assignee: NOVAMONT S.P.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/747,605

(22) PCT Filed: Jul. 29, 2016

(86) PCT No.: PCT/EP2016/068236
§ 371 (c)(1),
(2) Date: Jan. 25, 2018

(87) PCT Pub. No.: WO2017/021337
PCT Pub. Date: Feb. 9, 2017

(65) Prior Publication Data
US 2018/0208761 A1    Jul. 26, 2018

(30) Foreign Application Priority Data

Jul. 31, 2015   (IT) .................. 102015000040869

(51) Int. Cl.
| | | |
|---|---|---|
| C08L 67/02 | (2006.01) |
| C08L 67/04 | (2006.01) |
| C08K 5/29 | (2006.01) |
| C08K 3/013 | (2018.01) |
| B29C 45/00 | (2006.01) |
| C08K 5/06 | (2006.01) |
| C08K 5/10 | (2006.01) |
| C08K 5/14 | (2006.01) |
| C08K 5/1515 | (2006.01) |
| C08K 5/3492 | (2006.01) |
| C08K 7/02 | (2006.01) |
| B65D 65/46 | (2006.01) |
| C08K 3/34 | (2006.01) |
| B29K 67/00 | (2006.01) |
| B29L 31/00 | (2006.01) |

(52) U.S. Cl.
CPC .......... *C08L 67/02* (2013.01); *B29C 45/0001* (2013.01); *B65D 65/466* (2013.01); *C08K 3/013* (2018.01); *C08K 3/34* (2013.01); *C08K 5/06* (2013.01); *C08K 5/10* (2013.01); *C08K 5/14* (2013.01); *C08K 5/1515* (2013.01); *C08K 5/29* (2013.01); *C08K 5/34924* (2013.01); *C08K 7/02* (2013.01); *C08L 67/04* (2013.01); *B29K 2067/04* (2013.01); *B29L 2031/7174* (2013.01); *C08K 2201/003* (2013.01); *C08L 2201/06* (2013.01); *C08L 2203/30* (2013.01); *C08L 2205/02* (2013.01); *C08L 2205/03* (2013.01)

(58) Field of Classification Search
CPC ...... C08L 67/02; C08L 67/04; C08L 2203/30; C08K 3/34; C08K 5/29; C08K 2201/003; C08K 2201/06; B65D 65/466
See application file for complete search history.

(56) References Cited

U.S. PATENT DOCUMENTS

| | | | |
|---|---|---|---|
| 2001/0003761 A1 | 6/2001 | Ishibashi et al. | |
| 2008/0113887 A1 | 5/2008 | Scheer et al. | |
| 2013/0316106 A1* | 11/2013 | Nakano | C08L 67/02 428/35.5 |

FOREIGN PATENT DOCUMENTS

| | | | | |
|---|---|---|---|---|
| JP | 02005281677 | * | 2/2005 | .............. C08L 67/02 |
| WO | WO-02/059200 A1 | | 8/2002 | |
| WO | WO-2014/029692 A2 | | 2/2014 | |

* cited by examiner

*Primary Examiner* — Shane Fang
(74) *Attorney, Agent, or Firm* — Polsinelli PC

(57) ABSTRACT

This invention relates to a polymer composition that is particularly suitable for use in the manufacture of thermoformed articles, which can be biodegraded in industrial composting. This invention also relates to a process for the production of the said composition and articles obtained thereby.

20 Claims, No Drawings

POLYMER COMPOSITION FOR THE MANUFACTURE OF THERMOFORMED ARTICLES

CROSS REFERENCE TO RELATED APPLICATIONS

This application is a National Phase filing under 35 U.S.C. § 371 of PCT/EP2016/068236 filed on Jul. 29, 2016; and this application claims priority to Application No. 102015000040869 filed in Italy on Jul. 31, 2015 under 35 U.S.C. § 119. The entire contents of each application are hereby incorporated by reference.

DESCRIPTION

This invention relates to a polymer composition that is particularly suitable for use in the manufacture of articles moulded by means of thermoforming, which can be biodegraded in industrial composting.

This invention also relates to a process for the production of the said composition and articles obtained thereby.

As is known, the techniques of hot moulding plastics materials, such as thermoforming, mainly find application in the production of articles having a high resistance to deformation, such as for example, containers, tubs, plates or capsules for the dispensing of beverages, with walls having thicknesses typically greater than 200 microns.

Thermoformed articles present on the market do not possess the necessary properties of disintegratability to render them suitable to be composted in plants for industrial composting and resistance to deformation.

In view of the above it would be desiderable to have a composition capable of being transformed economically and productively into thermoformed articles, without adversely affecting compostability.

It has now surprisingly been discovered that it is possible to meet this requirement by means of a polymer composition for the production of thermoformed articles comprising:
  i) 20-60% by weight, preferably 30-50% by weight, with respect to the sum of components i.-iv. of at least one polyester comprising:
    a) a dicarboxylic component comprising, with respect to total dicarboxylic component:
      a1) 0-20% in moles, preferably 0-10% in moles, of units deriving from at least one aromatic dicarboxylic acid,
      a2) 80-100% in moles, preferably 90-100% in moles, of units deriving from at least one saturated aliphatic dicarboxylic acid,
      a3) 0-5% in moles, preferably 0.1-1% in moles, more preferably 0.2-0.7% in moles, of units deriving from at least one unsaturated aliphatic dicarboxylic acid;
    b) a diol component comprising, with respect to total diol component:
      b1) 95-100% in moles, preferably 97-100% in moles, of units deriving from at least one saturated aliphatic diol;
      b2) 0-5% in moles, preferably 0-3% in moles, of units deriving from at least one unsaturated aliphatic diol;
  ii) 5-35% by weight, preferably 10-20% by weight, with respect to the sum of components i.-iv., of at least one polyhydroxyalkanoate;
  iii) 0.01-5% by weight, preferably 0.02-3% by weight, with respect to the sum of components i.-iv., of at least one cross-linking agent and/or a chain extender comprising at least one compound having di- and/or multiple functional groups comprising isocyanate, peroxide, carbodiimide, isocyanurate, oxazoline, epoxy, anhydride or divinyl ether groups and mixtures thereof;
  iv) 5-50% by weight, preferably 10-40% by weight, with respect to the sum of components i.-iv., of at least one mineral filler agent, present in the form of particles having a median diameter of less than 1.5 microns.

With regard to the polyesters of the composition according to this invention, these comprise a dicarboxylic component which comprises, with respect to total dicarboxylic component, 0-20% in moles, preferably 0-10% in moles of units deriving from at least one aromatic dicarboxylic acid and 80-100% in moles, preferably 90-100% in moles of units deriving from at least one saturated aliphatic dicarboxylic acid and 0-5% in moles, preferably 0.1-1% in moles, more preferably 0.2-0.7% in moles, of units deriving from at least one unsaturated aliphatic dicarboxylic acid.

The aromatic dicarboxylic acids are preferably selected from aromatic dicarboxylic acids of the phthalic acid type, preferably terephthalic acid or isophthalic acid, more preferably terephthalic acid, and heterocyclic dicarboxylic acids, preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, their salts and their mixtures. In a preferred embodiment the said aromatic dicarboxylic acids comprise:
  from 1 to 99% in moles, preferably from 5 to 95% and more preferably from 10 to 80%, of terephthalic acid, its esters or its salts;
  from 99 to 1% in moles, preferably from 95 to 5% and more preferably from 90 to 20%, of 2,5-furandicarboxylic acid, its esters or its salts.

The saturated aliphatic dicarboxylic acids are preferably selected from $C_2$-$C_{24}$, preferably $C_4$-$C_{13}$, more preferably $C_4$-$C_{11}$, saturated dicarboxylic acids their $C_1$-$C_{24}$, preferably $C_1$-$C_4$, alkyl esters, their salts and their mixtures.

Preferably the saturated aliphatic dicarboxylic acids are selected from: succinic acid, 2-ethylsuccinic acid, glutaric acid, 2-methylglutaric acid, adipic acid, pimelic acid, suberic acid, azelaic acid, sebacic acid, undecandioic acid, dodecandioic acid, brassylic acid and their $C_{1-24}$ alkyl esters.

In a preferred embodiment of this invention the saturated aliphatic dicarboxylic acids comprise mixtures comprising at least 50% in moles, preferably more than 60% in moles, more preferably more than 65% in moles of succinic acid, adipic acid, azelaic acid, sebacic acid, brassylic acid, their $C_1$-$C_{24}$, preferably $C_1$-$C_4$, esters and their mixtures.

The unsaturated aliphatic dicarboxylic acids are preferably selected from itaconic acid, fumaric acid, 4-methylene-pimelic acid, 3,4-bis (methylene) nonandioic acid, 5-methylene-nonandioic acid, their $C_1$-$C_{24}$, preferably $C_1$-$C_4$, alkyl esters, their salts and their mixtures.

In a preferred embodiment of this invention the unsaturated aliphatic dicarboxylic acids comprise mixtures comprising at least 50% in moles, preferably more than 60% in moles, more preferably more than 65% in moles of itaconic acid, its $C_1$-$C_{24}$, preferably $C_1$-$C_4$ esters. More preferably, the unsaturated aliphatic dicarboxylic acids comprise itaconic acid.

The diol component of the polyesters of the composition according to this invention comprises 95-100% in moles, preferably 97-100% in moles, of units deriving from at least one saturated aliphatic diol, with respect to total diol component, and 0-5% in moles, preferably 0-3% in moles, with respect to total diol component, of units deriving from at least one unsaturated aliphatic diol.

In a preferred embodiment, the diol component of the polyesters of the composition according to this invention consists of saturated aliphatic diols.

With regard to the saturated aliphatic diols, these are preferably selected from 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanel, neopentylglycol, 2-methyl-1,3-propandiol, dianhydrosorbitol, dianhydromannitol, dianhydroiditol, cyclohexandiol, cyclohexanmethandiol, dialkyleneglycols and polyalkylene glycols with a molecular weight of 100-4000, such as for example polyethylene glycol, polypropylene glycol and their mixtures. Preferably the diol component comprises at least 50% in moles of one or more diols selected from 1,2-ethandiol, 1,3-propandiol, 1,4-butandiol. More preferably the diol component comprises, or consists of, 1,4-butandiol.

With regard to the unsaturated aliphatic diols these are preferably selected from cis 2-buten-1,4-diol, trans 2-buten-1,4-diol, 2-butyn-1,4-diol, cis 2-penten-1,5-diol, trans 2-penten-1,5-diol, 2-pentyn-1,5-diol, cis 2-hexen-1,6-diol, trans 2-hexen-1,6-diol, 2-hexyn-1,6-diol, cis 3-hexen-1,6-diol, trans 3-hexen-1,6-diol, 3-hexyn-1,6-diol.

With regard to polyesters i. in the composition, these are preferably selected from aliphatic polyesters ("AP") and aliphatic-aromatic polyesters ("AAPE").

In the meaning of this invention, by aliphatic polyesters AP are meant polyesters comprising a dicarboxylic component which consists, with respect to the total moles of the dicarboxylic component, of 95-100% in moles of at least one saturated aliphatic dicarboxylic acid and 0-5% in moles of at least one unsaturated aliphatic dicarboxylic acid, and a diol component comprising, with respect to the total moles of the diol component, 95-100% in moles of units deriving from at least one saturated aliphatic diol and 0-5% in moles of units deriving from at least one unsaturated aliphatic diol.

By AAPE polyesters, in this invention are meant polyesters comprising a dicarboxylic component which consists at least one aromatic dicarboxylic acid compound, at least one saturated aliphatic dicarboxylic acid and 0-5% in moles, with respect to the total moles of the dicarboxylic component, of at least one unsaturated aliphatic dicarboxylic acid and a diol component comprising, with respect to the total moles of the diol component, 95-100% in moles of units deriving from at least one saturated aliphatic diol and 0-5% in moles of units deriving from at least one unsaturated aliphatic diol.

In the case of the AP aliphatic polyesters, those preferred are polyesters in which the dicarboxylic component comprises units deriving from at least one $C_2$-$C_{24}$, preferably $C_4$-$C_{13}$, more preferably $C_4$-$C_{11}$ saturated aliphatic dicarboxylic acid, their $C_1$-$C_{24}$, preferably $C_1$-$C_4$ alkyl esters, their salts and their mixtures, and a diol component comprising units deriving from at least one saturated aliphatic diol, preferably selected from 1,2-ethandiol, 1,2-propandiol, 1,3-propandiol, 1,4-butandiol.

In a preferred embodiment of this invention, polyester i. of the composition comprises at least one aliphatic polyester (AP), preferably poly(1,4-butylene succinate), poly(1,4-butylene adipate), poly (1,4-butylene azelate), poly(1,4-butylene sebacate), poly(1,4-butylene adipate-co-1,4-butylene succinate), poly(1,4-butylene azelate-co-1,4-butylene succinate), poly(1,4-butylene sebacate-co-1,4-butylene succinate), poly(1,4-butylene succinate-co-1,4-butylene adipate-co-1,4-butylene azelate). In a particularly preferred embodiment the said aliphatic polyester is poly(1,4-butylene succinate).

In a further preferred embodiment of this invention the polyester of the composition comprises at least one aliphatic-aromatic polyester (AAPE), and is advantageously selected from:

(A) polyesters comprising repetitive units deriving from aromatic dicarboxylic acids of the phthalic acid type, preferably terephthalic acid, aliphatic dicarboxylic acids and aliphatic diols (AAPE-A), characterised by an aromatic units content of between 35 and 60% in moles, preferably between 40 and 55% in moles with respect to the total moles of the dicarboxylic component. The AAPE-A polyesters are preferably selected from: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly (1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate). poly(1,4-butylene azelate-co-1,4-butylene succinate-co-1,4-butylene terephthalate).

(B) polyesters comprising repetitive units deriving from heterocyclic dicarboxylic acids, preferably 2,5-furandicarboxylic acid, aliphatic dicarboxylic acids and aliphatic diols (AAPE-B), characterised by an aromatic units content of between 50 and 80% in moles, preferably of between 60 and 75% in moles with respect to the total moles of the dicarboxylic component. The AAPE-B polyesters are preferably selected from: poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate).

In addition to the dicarboxylic component and the diol component, the polyesters of the composition according to this invention preferably comprise repetitive units deriving from at least one hydroxy acid in a quantity of between 0 and 49%, preferably between 0 and 30% in moles with respect to the total moles of the dicarboxylic component. Examples of convenient hydroxyacids are glycolic, hydroxybutyric, hydroxycaproic, hydroxyvaleric, 7-hydroxyheptanoic, 8-hydroxycaproic, 9-hydroxynonanoic and lactic acids or lactides. The hydroxyacids may be inserted in the chain as such or may also be first caused to react with diacids or diols.

Long molecules with two functional groups including functional groups which are not in a terminal position may also be present in quantities of not more than 10% in moles with respect to the total moles of the dicarboxylic component. Examples are dimer acids, ricinoleic acid and acids incorporating epoxy functional groups and also polyoxyethylenes with molecular weights of between 200 and 10000.

Diamines, aminoacids and aminoalcohols may also be present in percentages up to 30% in moles with respect to the total moles of the dicarboxylic component.

During preparation of the polyesters of the composition according to this invention one or more molecules with multiple functional groups in quantities of between 0.1 and 3% in moles with respect to the total moles of the dicarboxylic component (as well as any hydroxyacids) may also advantageously be added in order to obtain branched products. Examples of these molecules are glycerol, pentaerythritol, trimethylolpropane, citric acid, dipentaerythritol, acid triglycerides, polyglycerols.

The molecular weight Mn of the polyesters of the composition according to this invention is preferably ≥20000, more preferably ≥40000. As far as the polydispersity index of the molecular weights Mw/Mn is concerned, this is instead preferably between 1.5 and 10, more preferably between 1.6 and 5 and even more preferably between 1.8 and 2.7.

The molecular weights $M_n$ and $M_w$ may be measured by means of Gel Permeation Chromatography (GPC). The determination may be performed with the cromatography system maintained at 40° C., using a set of three columns in series (particle diameter 5 µm and porosities of 500 Å, 10000 Å and 100000 Å) respectively, a refractive index detector, chloroform as eluent (flow 1 ml/min) and using polystyrene as the reference standard.

The terminal acid groups content of the polyesters of the composition according to this invention is preferably between 20 and 160 meq/kg.

The terminal acid groups content may be measured in the following way: 1.5-3 g of the polyester are placed in a 100 ml flask together with 60 ml of chloroform. After the polyester has completely dissolved 25 ml of 2-propanol are added and, immediately before the analysis, 1 ml of deionised water. The solution so obtained is titrated against a previously standardised solution of NaOH in ethanol. An appropriate indicator, such as for example a glass electrode for acid-base titrations in non-aqueous solvents, is used to determine the end point of the titration. The terminal acid groups content is calculated on the basis of the NaOH solution in ethanol consumed using the following equation:

$$\text{Terminal acid groups content (meq/kg polymer)} = \frac{\lfloor (V_{eq} - V_b) \cdot T \rfloor \cdot 1000}{P}$$

in which: $V_{eq}$=ml of NaOH in ethanol solution at the end point of the titration of the sample;
$V_b$=ml of NaOH in ethanol solution required to achieve a pH=9.5 during the blank titration;
T=concentration of the solution of NaOH in ethanol expressed in moles/litre;
P=weight of the sample in grams.

Preferably, the polyesters of the composition according to this invention have an inherent viscosity (measured with an Ubbelohde viscometer for solutions in $CHCl_3$ of concentration 0.2 g/dl at 25° C.) of more than 0.3 dl/g, preferably between 0.3 and 2 dl/g, more preferably between 0.4 and 1.3 dl/g.

Preferably, the polyesters of the composition according to this invention are biodegradable. In the meaning of this invention, by biodegradable polymers are meant polymers which are biodegradable according to standard EN 13432.

The polyesters of the composition according to this invention may be synthesised by any of the processes known in the art. In particular, they may advantageously be obtained through a polycondensation reaction.

Advantageously the synthesis process may be performed in the presence of a suitable catalyst. Among such suitable catalysts mention may, by way of example, be made of organometallic compounds of tin, for example derivatives of stannoic acid, titanium compounds, for example orthobutyl titanate, aluminium compounds, for example Al-triisopropyl, compounds of antimony and zinc and zirconium and mixtures thereof.

In order to ensure high properties of resistance to deformation for the thermoformed articles, the composition according to this invention comprises 5-35% by weight, preferably 10-20% by weight, with respect to the sum of components i.-iv., of at least one polyhydroxyalkanoate (component ii.) preferably selected from the group comprising the polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-esadecanoate, polyhydroxybutyrate-octadecanoate, poly 3-hydroxybutyrate-4-hydroxybutyrate. Preferably the polyhydroxyalkanoate of the composition comprises at least 80% by weight of one or more polyesters of lactic acid.

In a preferred embodiment the polyesters of lactic acid are selected from the group which comprises poly L lactic acid, poly D lactic acid, poly D-L lactic acid stereo complex, copolymers comprising more than 50% in moles of the said polyesters of lactic acid or their mixtures.

The polyesters of lactic acid containing at least 95% by weight of repetitive units deriving from L-lactic or D-lactic acid or their combinations, with a molecular weight Mw of more than 50,000 and with a shear viscosity of between 50 and 500 Pa·s, preferably between 100 and 300 Pa·s (measured according to standard ASTM D3835 at T=190° C., shear rate=$1000s^{-1}$, D=1 mm, L/D=10), are particularly preferred.

In a particularly preferred embodiment of the invention, the polyester of lactic acid comprises at least 95% by weight of units deriving from L-lactic acid, ≤5% of repetitive units deriving from D-lactic acid having a melting point in the range 135-170° C., a glass transition temperature (Tg) in the range 55-65° C. and an MFR (measured according to standard ASTM-D1238 at 190° C. and 2.16 kg) in the range 1-50 g/10 min. Commercial examples of polyesters of lactic acid having these properties are for example products of the Ingeo™ trade mark Biopolymer 4043D, 3251D and 6202D.

The composition according to this invention comprises 0.01-5% by weight, preferably 0.02-3% by weight, more preferably 0.1-1% by weight, of at least one cross-linking agent and/or chain extender (component iii.) which improves stability to hydrolysis and is selected from compounds having di- and/or multiple functional groups incorporating isocyanate, peroxide, carbodiimide, isocyanurate, oxazoline, epoxy, anhydride or divinyl ether groups and mixtures thereof.

Preferably, the cross-linking agent and/or chain extender comprises at least one compound having di- and/or multiple functional groups comprising isocyanate groups. More preferably the cross-linking agent and/or chain extender comprises at least 25% by weight of one or more compounds having di- and/or multiple functional groups incorporating isocyanate groups.

Particularly preferred are mixtures of compounds having di- and/or multiple functional groups incorporating isocyanate groups with compounds having di- and/or multiple functional groups incorporating epoxy groups, even more preferably comprising at least 75% by weight of compounds having di- and/or multiple functional groups incorporating isocyanate groups.

The compounds having di- and multiple functional groups incorporating isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'ditolylene-4,4-diisocyanate, 4,4'-methylenebis (2-methyl-phenyl isocyanate), hexamethylene diisocyanate, 1,3-cyclohexylene diisocyanate, 1,2-cyclohexylene diisocyanate and their mixtures. In a preferred embodiment, the compound comprising isocyanate groups is 4,4-diphenylmethane-diisocyanate.

With regard to compounds having di- and multiple functional groups incorporating peroxide groups, these are preferably selected from benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxy dicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and their mixtures.

The compounds having di- and multiple functional groups incorporating carbodiimide groups which are preferably used in the composition according to this invention are preferably selected from poly(cyclooctylene carbodiimide), poly(1,4-dimethylenecyclohexylene carbodiimide), poly(dicyclohexylmethane carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyldiphenylene carbodiimide) (Stabaxol® D), poly(2,4,6-triisolpropyl-1,3-phenylene carbodiimide) (Stabaxol® P-100), poly(2,6 diisopropyl-1,3-phenylene carbodiimide) (Stabaxol® P), poly (tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and their mixtures.

Examples of compounds having di- and multiple functional groups incorporating epoxy groups which may advantageously be used in the composition according to this invention are all the polyepoxides from epoxydised oils and/or styrene-glycidylether-methylmethacrylate, glycidylether methylmethacrylate, included in a range of molecular weights between 1000 and 10000 and having an epoxy number per molecule in the range from 1 to 30 and preferably between 5 and 25, and the epoxides selected from the group comprising: diethylene glycol diglycidylether, polyethylene glycol diglycidyl ether, glycerol polyglycidyl ether, diglycerol polyglycidyl ether, 1,2-epoxybutane, polyglycerol polyglycidyl ether, isoprene diepoxy and cycloaliphatic diepoxides, 1,4-cyclohexandimethanol diglycidyl ether, glycidyl 2-methylphenyl ether, glycerol propoxylatotriglycidyl ether, 1,4-butandiol diglycidyl ether, sorbitol polyglycidyl ether, glycerol diglycidyl ether, tetraglycidyl ether of metaxylenediamine and the diglycidyl ether of bisphenol A and their mixtures.

Together with the compounds having di- and multiple functional groups incorporating isocyanate, peroxide, carbodiimide, isocyanurate, oxazoline, epoxy, anhydride and divinylether groups of the composition according to this invention, catalysts may be also used to increase the reactivity of the reactive groups. In the case of polyepoxides, salts of fatty acids, even more preferably calcium and zinc stearates, are preferably used.

In a particularly preferred embodiment of the invention the cross-linking agent and/or chain extender of the composition comprises compounds incorporating isocyanate groups, preferably 4,4-diphenylmethane-diisocyanate, and/or incorporating carbodiimide groups, and/or incorporating epoxy groups, preferably of the styrene-glycidylether-methylmethacrylate type.

The composition according to this invention comprises 5-50% by weight, preferably 10-40% by weight, of at least one mineral filler agent (component iv.), present in the form of particles having a median diameter of less than 1.5 microns. preferably of less than 1.2 microns, wherein the particle size distribution is measured by Sedigraph according to ISO 13317-3. It has in fact been discovered that the mineral filler agents characterised by the said median diameter improve the resistance to deformation, the dimensional stability as well as the disintegratability properties of the thermoformed articles comprising the polymer composition according to this invention. Preferably, the thermoformed articles are characterised by G' modulus values, obtained at 70° C. through dynamic mechanical-torsional analysis (DMTA), higher than 180, preferably higher than 230 MPa, and G' modulus values, obtained at 90° C. through DMTA, higher than 125, preferably higher than 150 MPa.

In a preferred embodiment of this invention, the thermoformed articles are characterised by of G' modulus values obtained at 70° C. higher than 300 MPa, and values of G' obtained at 90° C. higher than 200 MPa.

Preferably, the mineral filler agent is selected from talc, carbonates of calcium and titanium dioxide. In a particularly preferred embodiment the said mineral filler agent is talc.

Without being bound thereby to any specific theory, it is felt that the said mineral filler agents, when used in the compositions according to the invention, become stratified and agglomerate during the moulding stage, thus slowing the action of the agents responsible for the disintegration of the thermoformed articles.

In addition to components i.-iv. the composition according to this invention preferably also contains at least one other component selected from the group consisting of plasticisers, UV stabilisers, lubricants, nucleating agents, surfactants, antistatic agents, pigments, flame retardants, compatibilising agents, lignin, organic acids, antioxidants, mould prevention agents, waxes, process coadjuvants and polymer components preferably selected from the group consisting of vinyl polymers, polyesters of diacid diols which are other than polyester i., polyamides, polyurethanes, polyethers, polyureas and polycarbonates.

With regard to plasticisers, in addition to the plasticisers preferably used for the preparation of destructured starch described above, there are preferably present in the composition according to this invention one or more plasticisers selected from the group comprising phthalates, such as for example diisononyl phthalate, trimellitates, such as for example the esters of trimellitic acid with $C_4$-$C_{20}$ monoalcohols preferably selected from the group comprising n-octanol and n-decanol, and aliphatic esters having the following structure:

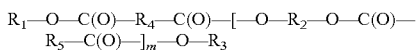

in which:
$R_1$ is selected from one or more of the groups comprising H, linear and branched saturated and unsaturated alkyl residues of the $C_1$-$C_{24}$ type, polyol residues esterified with $C_1$-$C_{24}$ monocarboxylic acids;
$R_2$ comprises —$CH_2$—$C(CH_3)_2$—$CH_2$— and alkylene $C_2$-$C_8$, groups and comprises at least 50% in moles of the said —$CH_2$—$C(CH_3)_2$—$CH_2$— groups;
$R_3$ is selected from one or more of the groups comprising H, linear and branched saturated and unsaturated alkyl residues of the $C_1$-$C_{24}$ type, polyol residues esterified with $C_1$-$C_{24}$ monocarboxylic acids;
$R_4$ and $R_5$ are the same or different, comprise one or more $C_2$-$C_{22}$, preferably $C_2$-$C_{11}$, more preferably $C_4$-$C_9$ alkylenes and comprise at least 50% in moles of $C_7$ alkylenes.
m is a number between 1 and 20, preferably 2-10, more preferably 3-7. Preferably, in the said esters at least one of the $R_1$ and/or $R_3$ groups comprises, preferably in quantities ≥10% in moles, more preferably ≥20%, even more preferably ≥25% in moles with respect to the total quantities of $R_1$ and/or $R_3$ groups, polyol residues esterified with at least one $C_1$-$C_{24}$ monocarboxylic acid selected from the group comprising stearic acid, palmitic acid, 9-ketostearic acid, 10-ketostearic acid and mixtures thereof. Examples of aliphatic esters of this type are described in Italian patent application MI2014A000030 and PCT applications PCT/EP2015/050336, PCT/EP2015/050338.

When present, the selected plasticisers are preferably present up to 10% by weight, with respect to the total weight of the composition.

The lubricants are preferably selected from esters and metal salts of fatty acids such as for example zinc stearate, calcium stearate, aluminium stearate and acetyl stearate. Preferably the composition according to this invention comprises up to 1% by weight of lubricants, more preferably up to 0.5% by weight, with respect to the total weight of the composition.

Examples of nucleating agents include the sodium salt of saccharine, calcium silicate, sodium benzoate, calcium titanate, boron nitride, isotactic polypropylene, low molecular weight PLA. These additives are preferably added in quantities up to 10% by weight and more preferably between 2 and 6% by weight with respect to the total weight of the composition.

Pigments may also be added if necessary, for example titanium dioxide, clays, copper phthalocyanin, titanium dioxide, silicates, oxides and hydroxides of iron, carbon black and magnesium oxide. These additives will preferably be added up to 10% by weight.

Among the vinyl polymers, those preferred are: polyethylene, polypropylene, their copolymers, polyvinyl alcohol, polyvinyl acetate, polyethyl vinyl acetate and polyethylene vinyl alcohol, polystyrene, chlorinated vinyl polymers, polyacrylates.

Among the chlorinated vinyl polymers these are here intended to include in addition to polyvinyl chloride: polyvinylidene chloride, polyethylene chloride, poly(vinyl chloride-vinyl acetate), poly(vinyl chloride-ethylene), poly(vinyl chloride-propylene), poly(vinyl chloride-styrene), poly (vinyl chloride-isobutylene) and copolymers in which polyvinyl chloride represents more than 50% in moles. The said copolymers may be random, block or alternating.

With regard to the polyamides of the composition according to this invention, these are preferably selected from the group consisting of polyamide 6 and 6,6, polyamide 9 and 9,9, polyamide 10 and 10,10, polyamide 11 and 11,11, polyamide 12 and 12,12 and their combinations of the 6/9, 6/10, 6/11, 6/12 type, their mixtures and both random and block copolymers.

Preferably the polycarbonates of the composition according to this invention are selected from the group comprising polyalkylene carbonates, more preferably polyethylene carbonates, polypropylene carbonates, polybutylene carbonates, their mixtures and copolymers both random and block copolymers.

Among the polyethers, those preferred are those selected from the group consisting of polyethylene glycols, polypropylene glycols, polybutylene glycols their copolymers and their mixtures with molecular weights from 70,000 to 500,000.

With regard to polyesters of diacid diols which are other than polyester i., these preferably comprise:
a) a dicarboxylic component comprising, with respect to the total dicarboxylic component:
a1) 20-100% in moles of units deriving from at least one aromatic dicarboxylic acid,
a2) 0-80% in moles of units deriving from at least one saturated aliphatic dicarboxylic acid,
a3) 0-5% in moles of units deriving from at least one unsaturated aliphatic dicarboxylic acid;
b) a diol component comprising, with respect to the total diol component:
b1) 95-100% in moles of units deriving from at least one saturated aliphatic diol;
b2) 0-5% in moles of units deriving from at least one unsaturated aliphatic diol.

Preferably, the aromatic dicarboxylic acids, saturated aliphatic dicarboxylic acids, unsaturated aliphatic dicarboxylic acids, saturated aliphatic diols and unsaturated aliphatic diols for the said polyesters are selected from those described above for the polyester (component i.) of the composition according to this invention. More preferably the said diacid-diol polyesters which are other than polyester i. are selected from the group consisting of poly(ethylene terephthalate), poly(propylene terephthalate), poly(butylene terephthalate), poly(ethylene 2,5furandicarboxylate), poly (propylene 2,5-furandicarboxylate), poly(butylene 2,5- furandicarboxylate) and block or random copolymers of the poly(alkylene 2,5-furandicarboxylate-co-alkylene terephthalate) type.

The production of the polymer composition according to this invention can be carried out by any of the processes known in the art. Advantageously the polymer composition according to this invention is produced by means of extrusion processes in which the polymer components are mixed in the fused state. In extruding the composition the components may be fed all together or one or more of them may be fed separately along the extruder.

This invention also relates to thermoformed articles, comprising the said polymer composition, which in fact has processability and performance in use properties which render it particularly suitable for this use. Its properties in fact make it possible to manufacture thermoformed articles having good resistance to deformation, high dimensional stability and bend temperature under load properties which are able to disintegrate and biodegrade in industrial composting processes.

Preferably, thermoformed articles, comprising the composition according to this invention, are biodegradable according to EN 13432, when having thickness up to 250 μm.

For example the polymer composition according to the invention is particularly suitable for the manufacture thermoformed articles such as for example, plates and cups, rigid containers, capsules for the dispensing of beverages, preferably hot beverages, lids and covers, and food packaging which can be heated in conventional and microwave ovens. The composition according to this invention and the thermoformed articles it comprises are preferably characterised by a THF content of below 10 mg/kg, preferably <5 mg/kg, and are capable of being used in contact with food, as occurs for example in the case of capsules for the dispensing of beverages. In a preferred embodiment this invention relates to a capsule for the dispensing of beverages characterised by a THF content of below 3 mg/kg, preferably 1 mg/kg. In the case of the compositions which comprise polyesters comprising 1,4-butylene dicarboxylate units as component i. the said low THF content can be obtained by subjecting the compositions according to this invention, or the thermoformed articles comprising them, to at least one stage of volatilisation of the THF.

In a preferred embodiment of this invention the said thermoformed articles comprise at least one layer A comprising the composition according to this invention and at least one layer B comprising at least one polymer selected from the group comprising diacid-diol polyesters and hydroxy acid polyesters, and are preferably characterised by a mutual arrangement of the said layers A and B selected from A/B, A/B/A and B/A/B. In a further particularly preferred embodiment the said layer B consists of a polyester of lactic acid.

As far as the process of moulding by means of thermoforming is concerned, the polymer composition according to this invention may be thermoformed by means of methods known to those skilled in the art, from for example from sheets or film, under pressure or under vacuum. This invention also relates to the said sheets or film comprising the composition according to this invention, used for the production of moulded articles by means of thermoforming.

Typical operating conditions for thermoforming provide for example a time of 5-8 seconds for heating the said sheets or film until they soften, and moulding times of between 15 and 20 seconds.

The invention will now be illustrated through a number embodiments which are intended to be by way of example and do not limit the scope of protection of this patent application.

EXAMPLES

Component i i-1=Poly(1,4-butylene succinate) ("PBS") prepared according to the following method:

17150 g of succinic acid, 14000 g of 1,4-butandiol, 26.75 g of glycerine and 2.0 g of an 80% by weight ethanolic solution of diisopropyl triethanolamine titanate (Tyzor TE, containing 8.2% by weight of titanium) were added to a steel reactor having a geometrical capacity of 40 litres fitted with a mechanical stirring system, an inlet for nitrogen, a distillation column, a knock-down system for high boiling point components and a connection to a high vacuum system in a diol/dicarboxylic acid (MGR) molar ratio of 1.08.

The temperature of the mass was gradually raised to 230° C. over a period of 120 minutes. When 95% of the theoretical water has been distilled off, 21.25 g of tetra n-butyl titanate (corresponding to 119 ppm of metal with respect to the quantities of poly1,4-butylene succinate that would be theoretically obtainable by converting all the succinic acid fed to the reactor) were added. The temperature of the reactor was then raised to 235-240° C. and the pressure was gradually reduced to a value below 2 mbar over a period of 60 minutes. The reaction was allowed to proceed for the time required to obtain a poly(1,4-butylene succinate) with an MFR of approximately 7 (g/10 minutes at 190° C. and 2.16 kg), and the material was then discharged in the form of a filament into a water bath and granulated.

i-2=Poly(1,4-butylene sebacate-co-1,4-butylene terephthalate) ("PBST") was prepared according to the following method: 8160 g of terephthalic acid, 11198 g of sebacic acid, 11296 g of 1,4-butanediol, 14.4 g of glycerine and 2.0 g of an 80% by weight ethanolic solution of diisopropyl triethanolamine titanate (Tyzor TE, containing 8.2% by weight of Titanium) were added in a diol/dicarboxylic acid molar ratio (MGR) of 1.20 to a steel reactor having a geometrical capacity of 40 litres, fitted with a mechanical stirrer system, an inlet for nitrogen, a distillation column, a knock-down system for high-volume distillates and a connection to a high vacuum system. The temperature of the mass was gradually increased to 230° C. over a period of 120 minutes. When 95% of the theoretical water had been distilled off, 21.2 g (corresponding to 119 ppm of metal with respect to the quantity of PBST which could theoretically be obtained by converting all the sebacic acid and all the terephthalic acid fed to the reactor) of tetra n-butyl Titanate was added. The temperature of the reactor was then raised to 235-240° C. and the pressure was gradually reduced until a value of less than 2 mbar was reached over a period of 60 minutes. The reaction was allowed to proceed for the time required to obtain a poly(1,4-butylene sebacate-co-1,4-butylene terephthalate) with an MFR of approximately 5 (g/10 minutes at 190° C. and 2.16 kg), and the material was then discharged in the form of a filament into a water bath and granulated.

Component ii
ii=Ingeo 4043D polylactic acid ("PLA"), MFR 3.5/10 min (at 190° C., 2.16 kg).
Component iii
iii-1=HMV-15CA Carbodilite from Nisshinbo Chemical Inc.;
iii-2=Luperox F40MG (1,3-1,4-bis(tert-butylperoxyisopropyl)-benzene in EPM rubber) from Arkema;
iii-3=masterbatch comprising 10% by weight of Joncryl ADR4368CS (styrene-glycidylether-methylmethacrylate copolymer) and 90% by weight of component ii.
Component iv
iv=micronised talc having a median diameter of 1 microns (particle size distribution by Sedigraph according to ISO 13317-3), Jetfine 3CA commercial grade from Imerys.

Examples 1-4

Production of Thermoformed Articles Comprising the Composition According to this Invention

TABLE 1

Compositions in Examples 1-4.
Components (% wt)

| Example | i-1 | i-2 | ii | iii-1 | iii-2 | iii-3 | iv |
|---------|------|-----|------|-------|-------|-------|------|
| 1 | 47.7 | — | 16 | 0.2 | | | 36.1 |
| 2 | 42.7 | 5 | 16 | 0.2 | | | 36.1 |
| 3 | 47.7 | — | 16 | — | 0.2 | — | 36.1 |
| 4 | 47.7 | — | 14.7 | — | — | 1.5 | 36.1 |

The composition in Table 1 was fed to an Icma San Giorgio MCM 25 HT model co-rotating twin screw extruder under the following operating conditions:
Screw diameter (D)=25 mm;
L/D=52;
Rotation speed=200 rpm;
Temperature profile=100-180-215×9-180-170-160° C.;
Throughput 10.1 kg/h;
Degassing under vacuum;
The granules were fed to a Curti single-screw extruder (screw diameter 40 mm-L/D 25) equipped with a flat head 400 mm wide and Teknomast compound rolling unit of 3 rolls of width 400 and diameter 200—and provided with water cooling. The operating conditions were as follows:
Screw diameter (D)=40 mm;
L/D=25;
Rotation speed=60 rpm;
Temperature profile=Extruder: 190-5×200° C./Head: 6×200° C.;
Throughput 20 kg/h.
From the sheets were obtained bars (length 30 mm, width 6 mm, thickness 0.5 mm) which then underwent dynamic mechanical-torsional analysis (DMTA) in torsional mode using an Ares G2 rotational rheometer from TA Instrument. The samples were heated from 30° C. to 120° C. at 3° C./min imposing a deformation of 0.1% and a frequency of 1 Hz.
Heat deflection temperature (HDT) was measured according to standard ASTM-D648 using a 0.455 MPa load (Method B), on moulded test specimens of the "bar" type (length 127 mm, width 12.7 mm, thickness 3.2 mm) using Ceast 6510 Test-A-Matic model equipment. HDT values were determined in triplicate for each composition. The value stated corresponds to the arithmetic mean of the measured values.

Sheets of 350 μm thickness were thermoformed on an Artpack thermoforming machine in a single die mould for the production of plates (diameter 220 mm, depth 40 mm) using the following thermoforming operating conditions:
Heating by means of 15 IR lamps (rated maximum power of each lamp 325 W);
Heating time 5-8 sec. (to softening);
Total cycle time 15-20 sec.
The plates obtained underwent a disintegration test in controlled composting according to standard ISO20200: 2004, showing a weight loss of more than 90% over 90 days at 58° C.

TABLE 2

HDT and DMTA characterization.

| Example | HDT ° C. | G' [MPa] a T = 70° C. | G' [MPa] a T = 90° C. |
|---------|----------|-----------------------|-----------------------|
| 1 | 91 ± 1 | 471 | 374 |
| 2 | 91 ± 1 | 398 | 306 |
| 3 | 91 ± 1 | 421 | 322 |
| 4 | 91 ± 1 | 349 | 238 |

The invention claimed is:
1. A polymer composition for the production of thermoformed articles comprising, with respect to the sum of components i.-iv.:
i) 20-60% by weight of at least one polyester i. comprising:
a) a dicarboxylic component comprising with respect to the total dicarboxylic component:
a2) 95-100% in moles of units deriving from succinic acid,
a3) 0-5% in moles of units deriving from at least one unsaturated aliphatic dicarboxylic acid;
b) a diol component comprising, with respect to the total diol component:
b1) 95-100% in moles of units deriving from at least one saturated aliphatic diol;
b2) 0-5% in moles of units deriving from at least one unsaturated aliphatic diol;
ii) 5-35% by weight of at least one polyhydroxyalkanoate ii.;
iii) 0.01-5% by weight of at least one cross-linking agent and/or a chain extender iii. comprising at least one compound having di- and/or multiple functional groups comprising isocyanate, peroxide, carbodiimide, isocyanurate, oxazoline, epoxy, anhydride, divinyl ether groups and mixtures thereof;
iv) 5-50% by weight of at least one mineral filler agent present in the form of particles having a median diameter of less than 1.5 microns.
2. The polymer composition according to claim 1, in which the said aliphatic polyester (AP) is poly(1,4-butylene succinate).
3. The polymer composition according to claim 1, in which the said at least one polyhydroxyalkanoate ii. is selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-esadecanoate, polyhydroxybutyrate-ottadecanoate, and poly-3-hydroxybutyrate 4-hydroxybutyrate.
4. The polymer composition according to claim 1, wherein the said at least one mineral filler agent iv. is talc.

5. The polymer composition according to claim 1, wherein the said mineral filler agent is present in the form of particles having a median diameter of less than 1.2 microns.

6. A thermoformed article comprising the polymer composition according to claim 1.

7. The thermoformed article according to claim 6, selected from the group consisting of, a plate, a cup, a rigid container, a capsule for the dispensing of a beverage, a lid, a cover, or a container for food which can be heated in a conventional or microwave oven.

8. The polymer composition according to claim 3, in which the said aliphatic polyester (AP) is poly(1,4-butylene succinate).

9. The polymer composition according to claim 4, in which the said aliphatic polyester (AP) is poly(1,4-butylene succinate).

10. The polymer composition according to claim 4, in which the said at least one polyhydroxyalkanoate ii. is selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-esadecanoate, polyhydroxybutyrate-ottadecanoate, and poly-3-hydroxybutyrate 4-hydroxybutyrate.

11. The polymer composition according to claim 5, in which the said at least one polyhydroxyalkanoate ii. is selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-esadecanoate, polyhydroxybutyrate-ottadecanoate, and poly-3-hydroxybutyrate 4-hydroxybutyrate.

12. The polymer composition according to claim 2, wherein the said at least one mineral filler agent iv. is talc.

13. The polymer composition according to claim 3, wherein the said at least one mineral filler agent iv. is talc.

14. A thermoformed article comprising the polymer composition according to claim 3.

15. A thermoformed article comprising the polymer composition according to claim 4.

16. A thermoformed article comprising the polymer composition according to claim 2.

17. The polymer composition according to claim 1, wherein the aliphatic polyester (AP) is poly(1,4-butylene succinate), the at least one polyhydroxyalkanoate ii. is a polyester of lactic acid containing at least 95% by weight of repetitive units deriving from L-lactic or D-lactic acid or their combinations, with a molecular weight Mw of more than 50,000 and with a shear viscosity of between 50 and 500 Pa·s; and the at least one filler agent iv. is talc in the form of particles having a median diameter of less than 1.2 microns.

18. The polymer composition according to claim 17, wherein the at least one cross-linking agent and/or a chain extender iii. is a mixture of compounds comprising at least 75% by weight of a compound having di- and/or multiple functional groups incorporating isocyanate groups with a compound having di- and/or multiple functional groups incorporating epoxy groups.

19. The polymer composition according to claim 1, wherein the at least one cross-linking agent and/or a chain extender iii. is a mixture of compounds comprising at least 75% by weight of a compound having di- and/or multiple functional groups incorporating isocyanate groups with a compound having di- and/or multiple functional groups incorporating epoxy groups.

20. The polymer composition according to claim 2, wherein the at least one cross-linking agent and/or a chain extender iii. is a mixture of compounds comprising at least 75% by weight of a compound having di- and/or multiple functional groups incorporating isocyanate groups with a compound having di- and/or multiple functional groups incorporating epoxy groups.

* * * * *